United States Patent
Gopalan et al.

(10) Patent No.: US 10,897,706 B2
(45) Date of Patent: Jan. 19, 2021

(54) BOOTSTRAPPING WI-FI DIRECT COMMUNICATION BY A TRUSTED NETWORK ENTITY

(71) Applicant: Samsung Electronics Co., Ltd., Suwon-si (KR)

(72) Inventors: Karthik Srinivasa Gopalan, Bangalore (IN); Mayuresh Madhukar Patil, Bangalore (IN); Rajavelsamy Rajadurai, Bangalore (IN); Byung-Moo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 15/524,509

(22) PCT Filed: Nov. 6, 2015

(86) PCT No.: PCT/KR2015/011889
§ 371 (c)(1),
(2) Date: May 4, 2017

(87) PCT Pub. No.: WO2016/072781
PCT Pub. Date: May 12, 2016

(65) Prior Publication Data
US 2017/0339557 A1    Nov. 23, 2017

(30) Foreign Application Priority Data

Nov. 6, 2014 (IN) .......................... 5595/CHE/2014
Oct. 30, 2015 (IN) .......................... 5595/CHE/2014

(51) Int. Cl.
*H04L 29/06* (2006.01)
*H04W 12/04* (2009.01)
(Continued)

(52) U.S. Cl.
CPC ............. *H04W 12/04* (2013.01); *H04L 12/06* (2013.01); *H04L 63/061* (2013.01);
(Continued)

(58) Field of Classification Search
CPC . H04W 12/0403–04033; H04W 12/04–04033; H04L 63/06–068
See application file for complete search history.

(56) References Cited

U.S. PATENT DOCUMENTS

2008/0170549 A1*  7/2008  Everson ................ H04W 12/08
370/338
2012/0121089 A1*  5/2012  Morioka ........... H04W 12/0407
380/270
(Continued)

FOREIGN PATENT DOCUMENTS

CN    102812688 A    12/2012
CN    103391545 A    11/2013
(Continued)

OTHER PUBLICATIONS

Chinese Office Action dated Jul. 26, 2019, issued in Chinese Patent Application No. 201580060614.1.
(Continued)

*Primary Examiner* — Matthew T Henning
(74) *Attorney, Agent, or Firm* — Jefferson IP Law, LLP

(57) ABSTRACT

The present disclosure relates to a pre-5th-Generation (5G) or 5G communication system to be provided for supporting higher data rates beyond 4th-Generation (4G) communication system such as a Long Term Evolution (LTE). Embodiments herein provide a method for establishing a wireless-fidelity (Wi-Fi) direct connection between a first user equipment (UE) and a second UE. The method includes sending, by a trusted network entity, a request message to each of the first UE and the second UE. Further, the method
(Continued)

includes receiving, by the trusted network entity, a response message from each of the first UE and the second UE. Further, the method includes generating, by the trusted network entity, at least one Wi-Fi key based on the response message. Further, the method includes sending, by the trusted network entity, a setup request message to each of the first UE and the second UE, wherein the setup request message comprises the at least one of a Wi-Fi key, a group owner identifier, and network data to establish the Wi-Fi direct connection between the first UE and the second UE.

19 Claims, 7 Drawing Sheets

(51) Int. Cl.
*H04W 76/14* (2018.01)
*H04W 76/10* (2018.01)
*H04L 12/06* (2006.01)
*H04W 12/08* (2009.01)
*H04W 84/12* (2009.01)
*H04W 8/00* (2009.01)

(52) U.S. Cl.
CPC ..... *H04W 12/04031* (2019.01); *H04W 76/10* (2018.02); *H04W 76/14* (2018.02); *H04L 63/0869* (2013.01); *H04W 8/005* (2013.01); *H04W 12/08* (2013.01); *H04W 84/12* (2013.01)

(56) References Cited

U.S. PATENT DOCUMENTS

| | | |
|---|---|---|
| 2013/0013926 A1 | 1/2013 | Hakola et al. |
| 2013/0170482 A1 | 7/2013 | Jung |
| 2014/0213218 A1 | 7/2014 | Iwamura et al. |
| 2014/0295868 A1 | 10/2014 | Lee |
| 2014/0301552 A1 | 10/2014 | Yi et al. |
| 2014/0307727 A1 | 10/2014 | Cha et al. |
| 2015/0305070 A1* | 10/2015 | Ahmad ................. H04W 76/10 370/338 |
| 2016/0286395 A1* | 9/2016 | Adrangi ................ H04W 12/06 |

FOREIGN PATENT DOCUMENTS

| | | |
|---|---|---|
| EP | 2663051 A1 | 11/2013 |
| EP | 2785011 A1 | 10/2014 |
| WO | 2012/137633 A1 | 10/2012 |
| WO | 2012/174152 A2 | 12/2012 |
| WO | 2014/131009 A1 | 8/2014 |
| WO | 2014/163383 A1 | 10/2014 |
| WO | 2014/165747 A1 | 10/2014 |

OTHER PUBLICATIONS

XP014224157, "Universal Mobile Telecommunications System(UMTS)", (3GPP TS 33.303 version 12.1.0 Release 12); Cedex, Franc; Oct. 1, 2014.

* cited by examiner

[Fig. 1a]
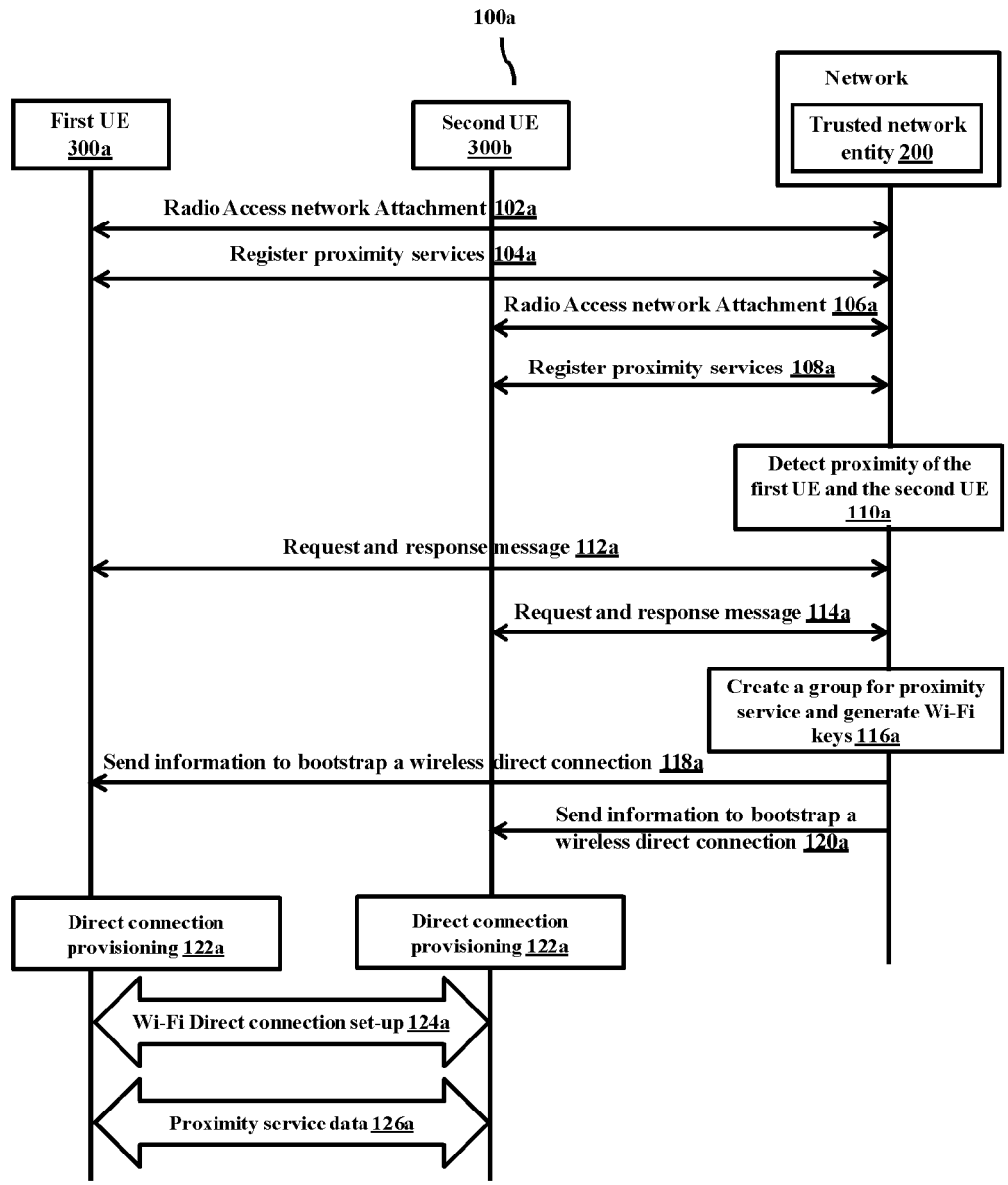

[Fig. 1b]
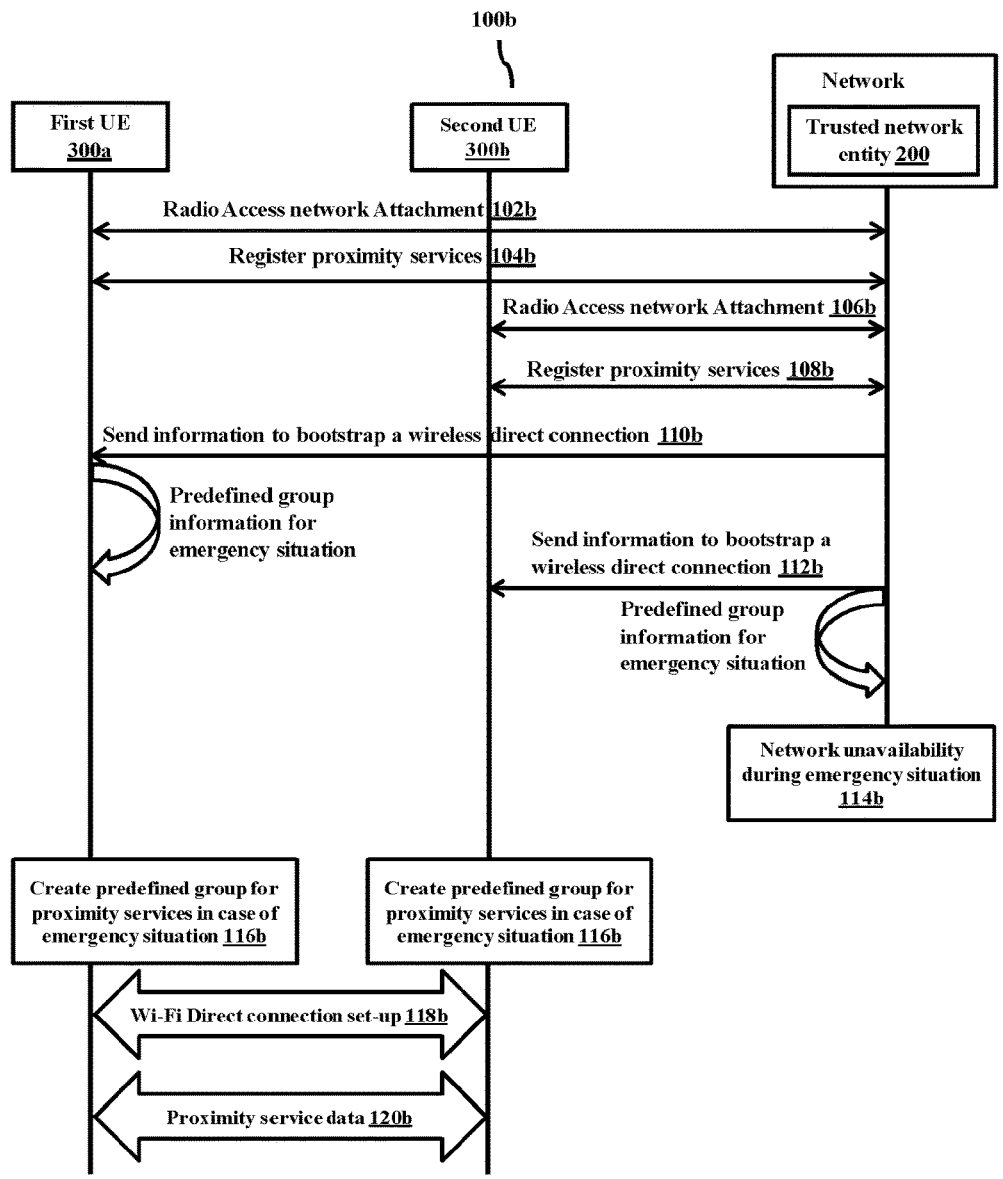
[Fig. 2]
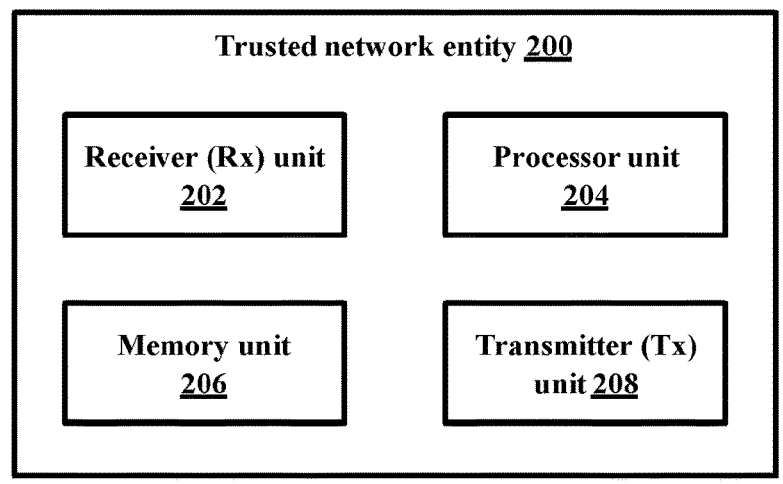

[Fig. 3]
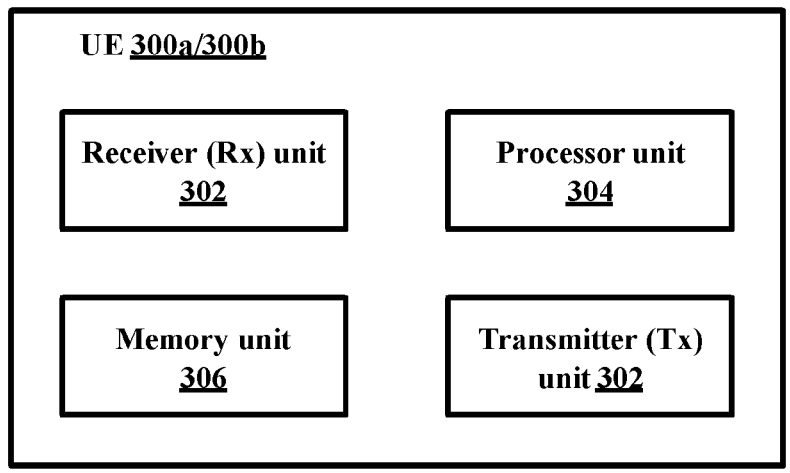
[Fig. 4]
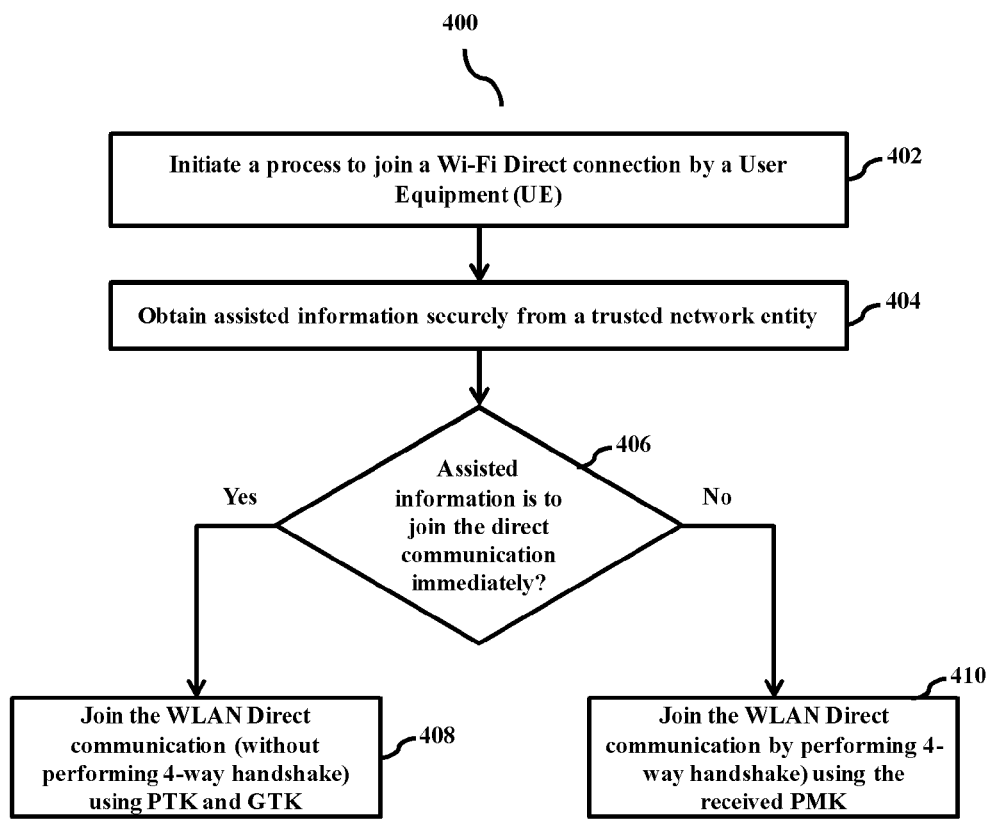

[Fig. 5]
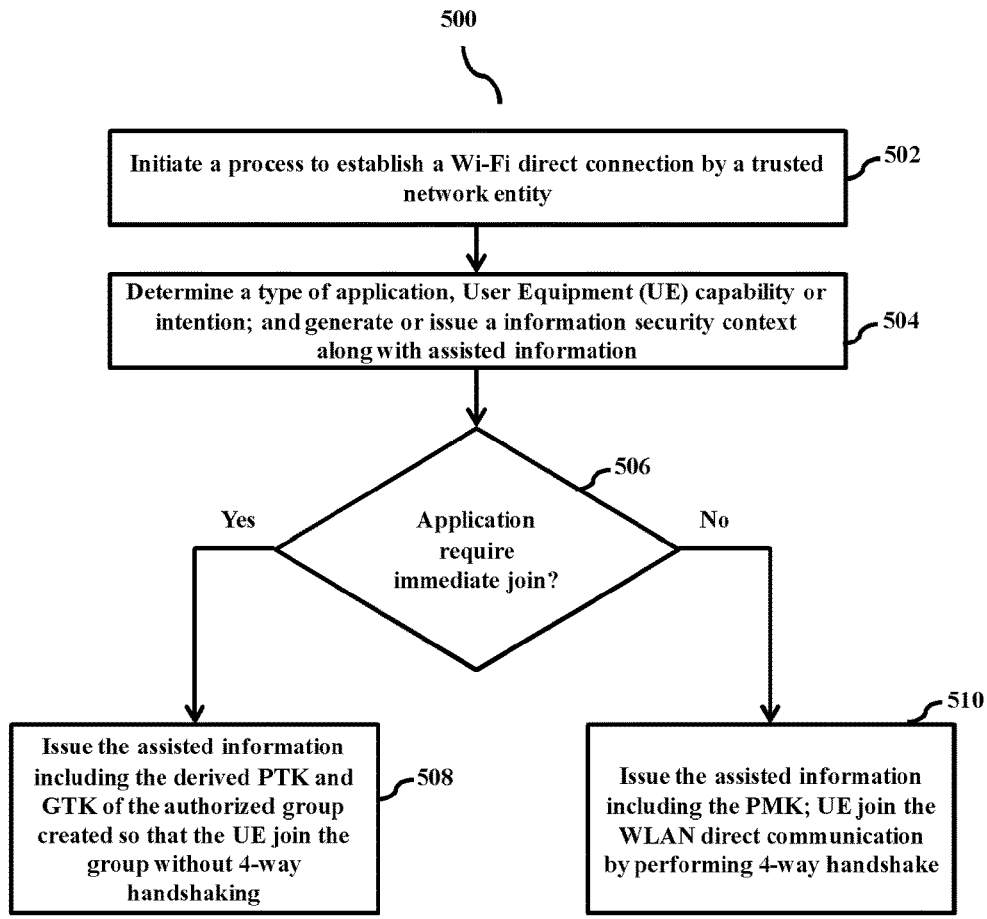
[Fig. 6]
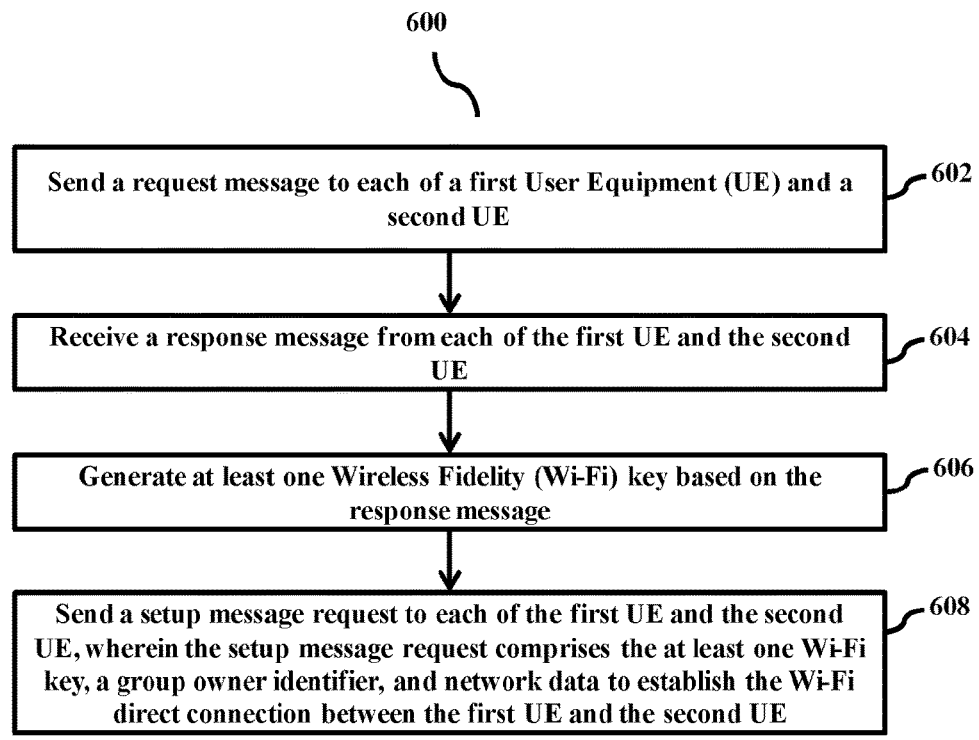

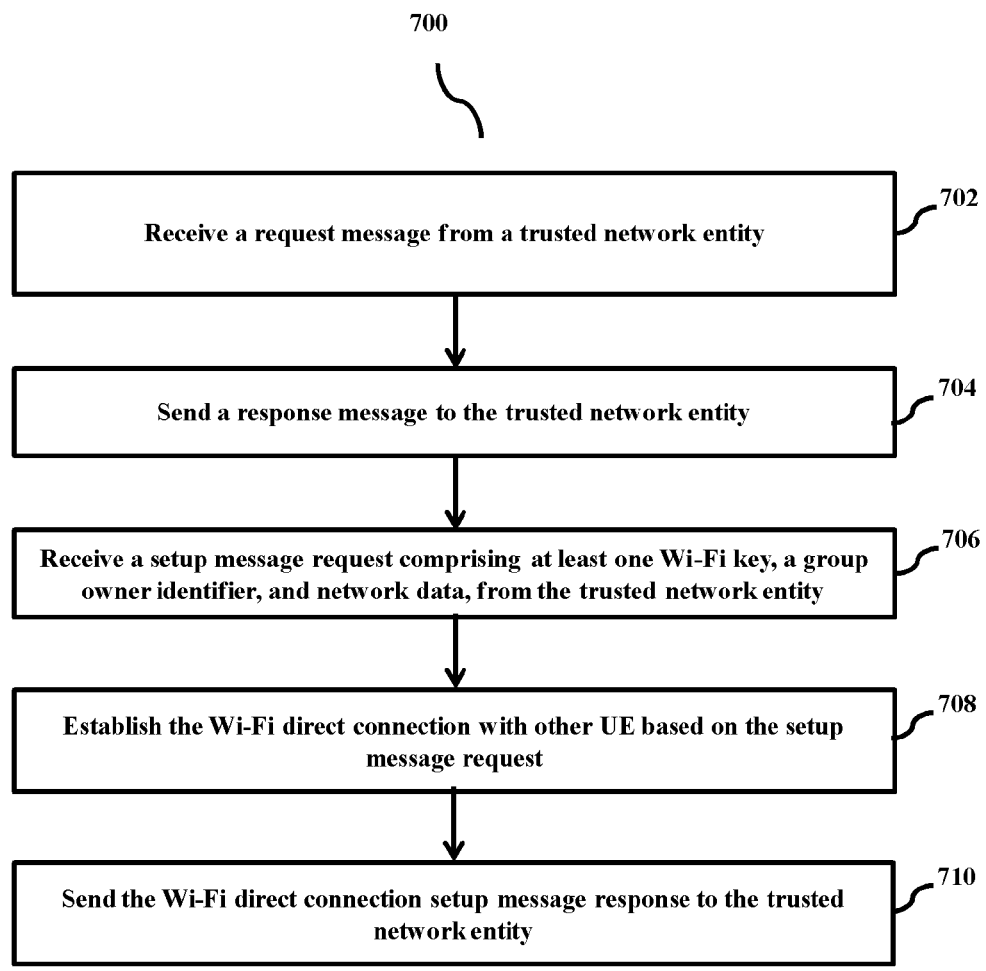

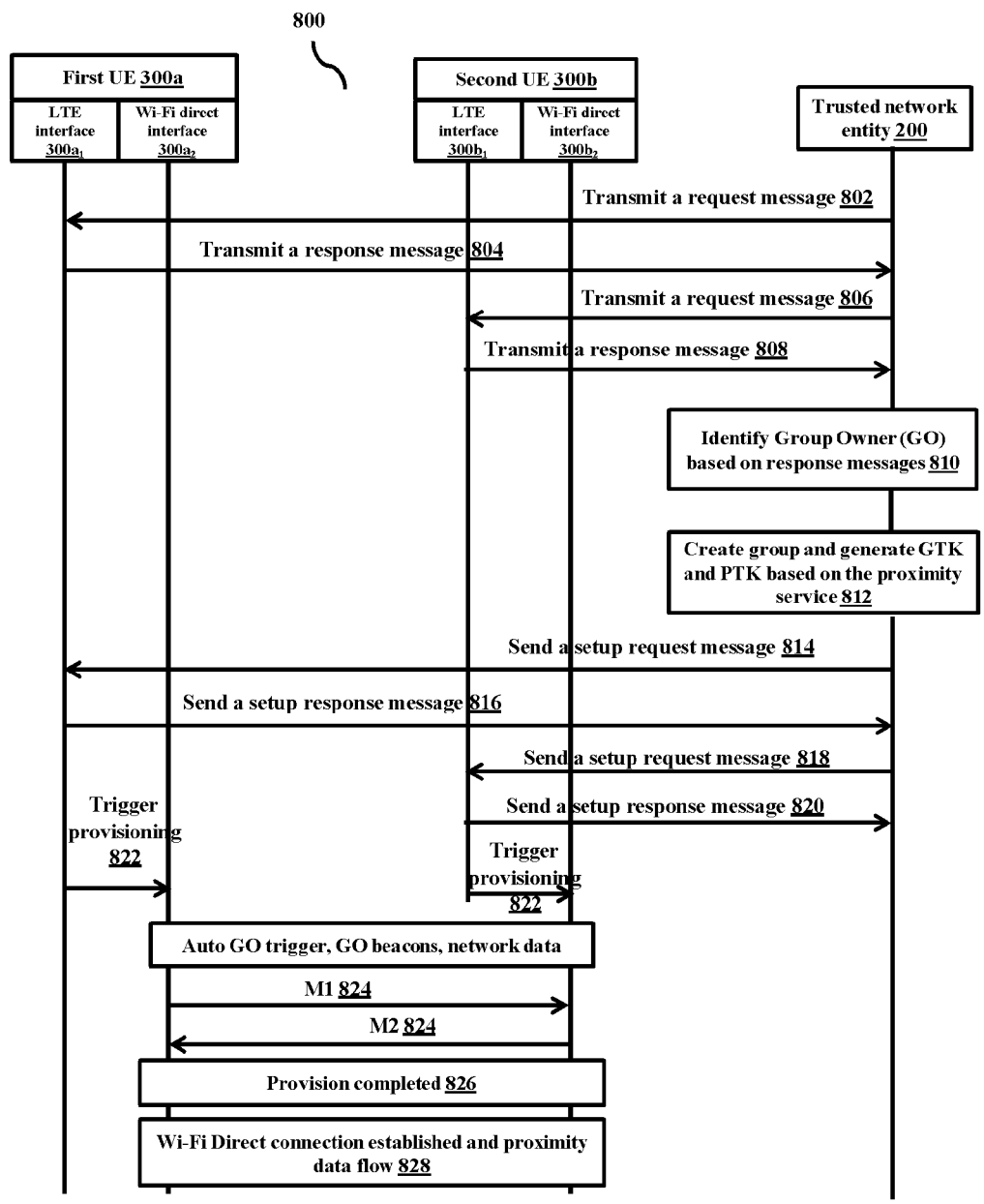
[Fig. 8]

[Fig. 9]
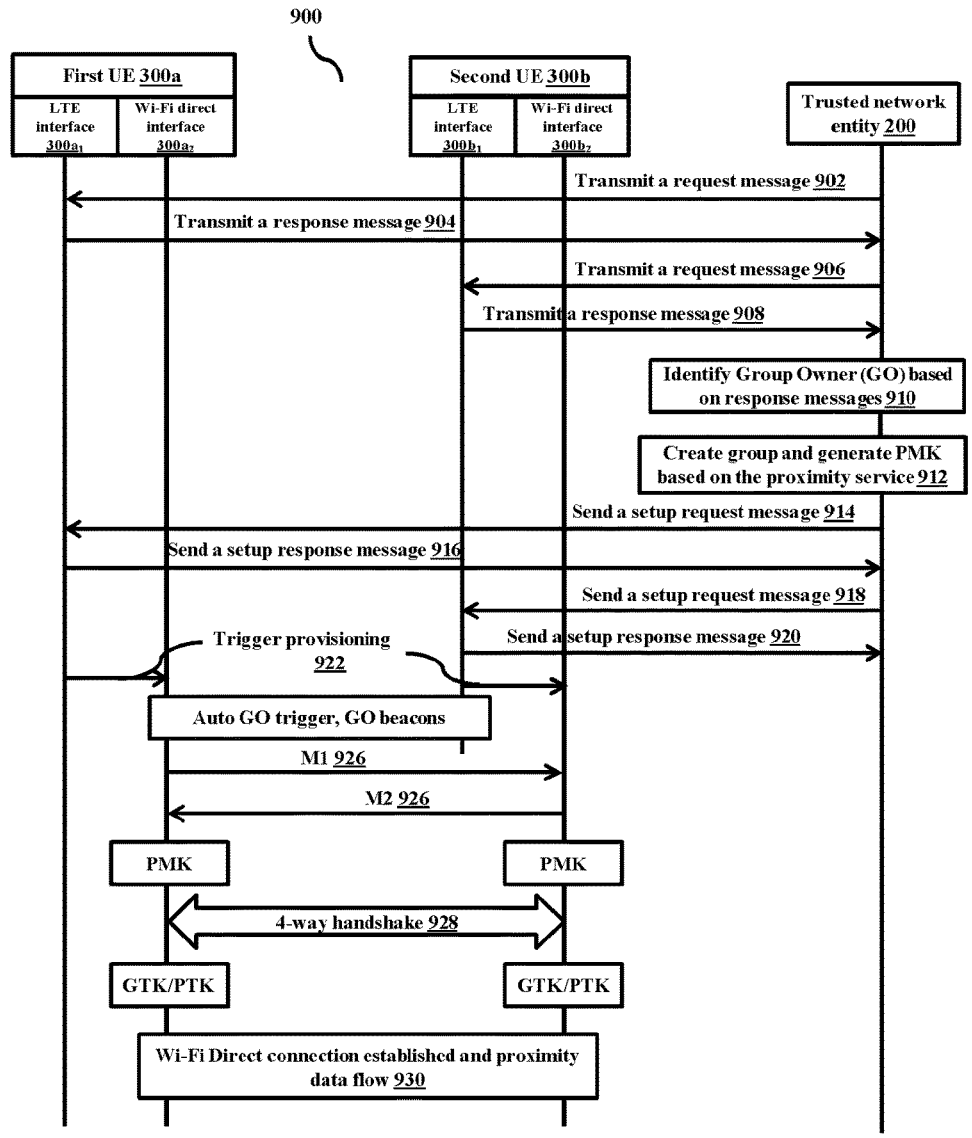
[Fig. 10]
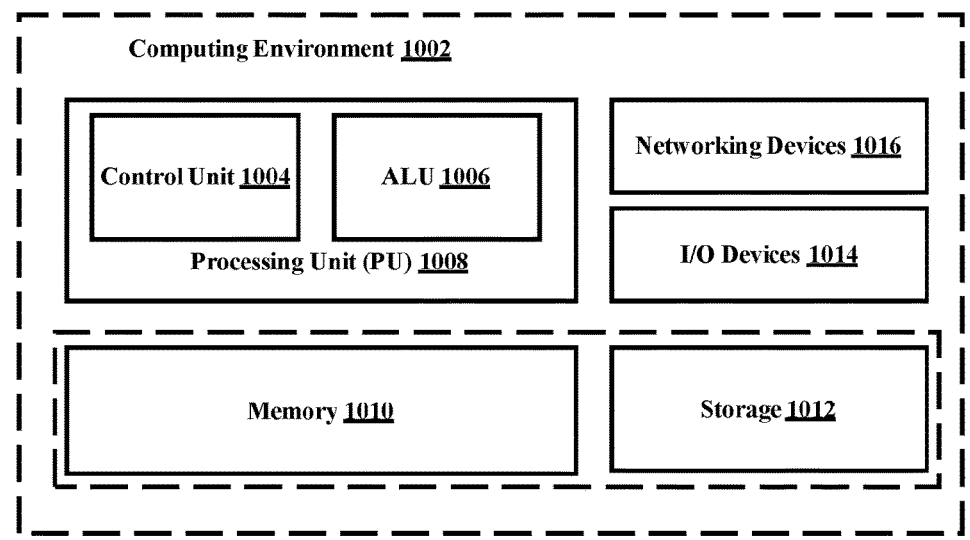

BOOTSTRAPPING WI-FI DIRECT COMMUNICATION BY A TRUSTED NETWORK ENTITY

CROSS-REFERENCE TO RELATED APPLICATION(S)

This application is a U.S. National Stage application under 35 U.S.C. § 371 of an International application filed on Nov. 6, 2015 and assigned application number PCT/KR2015/011889, which claimed the benefit of an Indian patent application filed on Nov. 6, 2014 in the Indian Intellectual Property Office and assigned Serial number 5595/CHE/2014, and an Indian patent application filed on Oct. 30, 2015 in the Indian Intellectual Property Office and assigned Serial number 5595/CHE/2014, the disclosures of each of which is hereby incorporated by reference.

TECHNICAL FIELD

The embodiments herein generally relate to wireless communications systems. More particularly, related to a mechanism for bootstrapping a wireless fidelity (Wi-Fi) direct communication by a trusted network entity.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Device-to-device (D2D) communication is being studied in communication standard groups to enable data communication services between user equipments (UEs). One of the objectives of 3rd generation partnership project (3GPP) Rel-12 proximity service (ProSe) work item is: evolved packet core (EPC) support of ProSe communication over a wireless local area network (WLAN). 3GPP Rel-12 Technical Specification 23.303 specified the provision for the EPC to support for the WLAN direct discovery and communication. The motivation in EPC support of ProSe communication over the WLAN is, during critical communication scenario, it may be required for the EPC after discovery to offload the direct communication between the UEs in proximity to directly communicate using other radio access technology (RATs) such as WLAN direct.

Currently, a long term evolution (LTE) network has been employed as an infrastructure communication network of the public safety communication service thereof. In the current public safety communication demands, there is a particular need for supporting the ProSe between the UEs, including a ProSe discovery and a ProSe communication for discovering a ProSe user or being discovered by the ProSe user. Also, supporting direct path communications between the UEs of the ProSe users or supporting the UE of the ProSe user to implement a locally routed communication over the network. In the current release of the 3GPP, there is a lack of the definition on the support and capability of the ProSe.

During critical communication scenario, the UEs are required to join the group immediately and initiate listening or transmitting securely (may be by (group owner) (GO)) to communicate without any signaling overhead. However, the conventional WLAN direct out-of-band provisioning mechanisms require the UEs to exchange control signaling before exchange of the information. Thus, the signaling exchange before exchange of the information, leads to signaling overload, increase in battery power consumption and processing load.

Thus, there is need of a simple and robust mechanism to easily enable the direct communication.

The above information is presented as background information only to assist with an understanding of the present disclosure. No determination has been made, and no assertion is made, as to whether any of the above might be applicable as prior art with regard to the present disclosure.

SUMMARY

Technical Problem

The principal object of the embodiments herein is to provide a mechanism for bootstrapping a wireless fidelity (Wi-Fi) direct communication between user equipments (UEs) by a trusted network entity.

Another object of the embodiments herein is to provide a mechanism for sending, by a trusted network entity, a request message to the UEs.

Another object of the embodiments herein is to provide a mechanism for receiving, by the trusted network entity, a response message from the UEs.

Another object of the embodiments herein is to provide a mechanism for generating, by the trusted network entity, at least one Wi-Fi key based on the response message.

Another object of the embodiments herein is to provide a mechanism for sending, by the trusted network entity, a setup request message to the UEs, wherein the setup request message comprises at least one of a Wi-Fi key, a group owner identifier, and network data to establish the Wi-Fi direct connection between the UEs.

Yet another object of the embodiments herein is to provide a mechanism for receiving, by the UE, the request message from the trusted network entity.

Yet another object of the embodiments herein is to provide a mechanism for sending, by the UE, the response message to the trusted network entity.

Yet another object of the embodiments herein is to provide a mechanism for receiving, by the UE, the setup request message comprising the at least one of the Wi-Fi key, the group owner identifier, and network data, from the trusted network entity.

Yet another object of the embodiments herein is to provide a mechanism for establishing, by the UE, the Wi-Fi direct connection with the other UE based on the setup request message, avoiding a Wi-Fi direct discovery, a group owner negotiation, a Wi-Fi direct secure provisioning, Wi-Fi direct security association establishment procedure and internet protocol (IP) allocations.

Accordingly the embodiments herein provide a method for establishing a wireless-fidelity (Wi-Fi) direct connection between a first user equipment (UE) and a second UE. The method includes sending, by a trusted network entity, a request message to each of the first UE and the second UE. Further, the method includes receiving, by the trusted network entity, a response message from each of the first UE and the second UE. Further, the method includes generating, by the trusted network entity, at least one Wi-Fi key based on the response message. Further, the method includes sending, by the trusted network entity, a setup request message to each of the first UE and the second UE, wherein the setup request message comprises at least one of the Wi-Fi key, a group owner identifier, and network data to establish the Wi-Fi direct connection between the first UE and the second UE.

Accordingly the embodiments herein provide a method for establishing a wireless-fidelity (Wi-Fi) direct connection by a first user equipment (UE) with a second UE. The method includes receiving, by the first UE, a request message from a trusted network entity. Further, the method includes sending, by the first UE, a response message to the trusted network entity. Further, the method includes receiving, by the first UE, a setup request message comprising at least one of a Wi-Fi key, a group owner identifier, and network data, from the trusted network entity. Further, the method includes establishing, by the first UE, the Wi-Fi direct connection with the second UE based on the setup request message immediately with no or minimal control signaling message exchanges.

Accordingly the embodiments herein provide a trusted network entity for establishing a wireless-fidelity (Wi-Fi) direct connection between a first user equipment (UE) and a second UE. The trusted network entity includes a memory and a processor coupled to the memory. The processor is configured with processor executable instructions to send a request message to each of the first UE and a second UE. Further, the processor is configured to receive a response message from each of the first UE and the second UE. Further, the processor is configured to generate at least one Wi-Fi key based on the response message. Further, the processor is configured to send a setup request message to each of the first UE and the second UE, wherein the setup request message comprises the at least one Wi-Fi key, a group owner identifier, networking data to establish the Wi-Fi direct connection between the first UE and the second UE.

Accordingly the embodiments herein provide a user equipment (UE) for establishing a wireless-fidelity (Wi-Fi) direct connection. The UE includes a memory and a processor coupled to the memory. The processor is configured with processor executable instructions to receive a request message from a trusted network entity. Further, the processor is configured to send a response message to the trusted network entity. Further, the processor is configured to receive a setup request message comprising at least one of a Wi-Fi key, a group owner identifier, and network data from the trusted network entity. Further, the processor is configured to establish the Wi-Fi direct connection with other UE based on the setup request message.

Accordingly the embodiments herein provide a computer program product comprising computer executable program code recorded on a computer readable non-transitory storage medium, the computer executable program code when executed causing the actions including sending, by a trusted network entity, a request message to each of a first user equipment (UE) and a second UE. Further, the computer executable program code when executed causing the actions including receiving, by the trusted network entity, a response message from each of the first UE and the second UE. Further, the computer executable program code when executed causing the actions including generating, by the trusted network entity, at least one Wi-Fi key based on the response message. Further, the computer executable program code when executed causing the actions including sending, by the trusted network entity, a setup request message to each of the first UE and the second UE, wherein the setup request message comprises at least one of a Wi-Fi key, a group owner identifier, and network data to establish the Wi-Fi direct connection between the first UE and the second UE.

Accordingly the embodiments herein provide a computer program product comprising computer executable program code recorded on a computer readable non-transitory storage medium, the computer executable program code when executed causing the actions including receiving, by a first user equipment (UE), a request message from a trusted network entity. Further, the computer executable program code when executed causing the actions including sending, by the first UE, a response message to the trusted network entity. Further, the computer executable program code when executed causing the actions including receiving, by the first UE, a setup request message comprising at least one of a Wi-Fi key, a group owner identifier, and network data, from the trusted network entity. Further, the computer executable program code when executed causing the actions including establishing, by the first UE, the Wi-Fi direct connection with the second UE based on the setup request message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1a illustrates a wireless communication system for bootstrapping a wireless fidelity (Wi-Fi) direct communication by a trusted network entity, according to an embodiment disclosed herein;

FIG. 1b illustrates another wireless communication system for establishing a Wi-Fi direct connection between a first UE and a second UE during emergency situation, according to an embodiment as disclosed herein;

FIG. 2 illustrates various units in a trusted network entity, according to an embodiment disclosed herein;

FIG. 3 illustrates various units in a UE, according to an embodiment disclosed herein;

FIG. 4 is a flow chart illustrating a method for joining a Wi-Fi direct connection by a UE, according to an embodiment as disclosed herein;

FIG. 5 is a flow chart illustrating a method for establishing a Wi-Fi direct connection by a trusted network entity, according to an embodiment as disclosed herein;

FIG. 6 is a flow chart illustrating a method for establishing a Wi-Fi direct connection between a first UE and a second UE by a trusted network entity, according to an embodiment as disclosed herein;

FIG. 7 is another flow chart illustrating a method for establishing a Wi-Fi direct connection by a UE with other UE by a trusted network entity, according to an embodiment as disclosed herein;

FIG. 8 is a sequence diagram depicts various signaling messages where Wi-Fi keys are sent to a first UE and a second UE by a trusted network entity to provision the Wi-Fi direct communication, according to an embodiment as disclosed herein;

FIG. 9 is another sequence diagram depicts various signaling messages where Wi-Fi keys are sent to a first UE and a second UE by a trusted network entity to provision the Wi-Fi direct communication, according to an embodiment as disclosed herein; and FIG. 10 illustrates a computing environment implementing the method for bootstrapping a Wi-Fi direct communication by a trusted network entity, according to embodiments as disclosed herein.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for establishing a wireless-fidelity (Wi-Fi) direct connection between a first user equipment (UE) and a second UE. The method includes sending a request message to each of the first UE and the second UE. Further, the method includes receiving a response message from each of the first UE and the second UE. Further, the method includes generating, by a trusted network entity, at least one Wi-Fi key based on the response message. Further, the method includes sending a setup request message to each of the first UE and the second UE, wherein the setup request message includes the Wi-Fi key, a group owner identifier, network data, or combination of same to establish the Wi-Fi direct connection between the first UE and the second UE.

In an embodiment, the Wi-Fi key is a group temporal key (GTK) and a pairwise transient key (PTK).

In another embodiment, the Wi-Fi key is the GTK, the PTK, and a pairwise master key (PMK).

In an embodiment, each response message includes at least one of an interface address and group owner (GO) intent.

In an embodiment, the interface address is a physical medium access control (MAC) address of a Wi-Fi interface; or an address of a virtual MAC Wi-Fi interface allocated for a proximity service (ProSe) communication.

In an embodiment, the first UE or the second UE, whose GO intent is higher, is declared as a group owner.

In an embodiment, the trusted network entity selects the GO and group client roles among the first UE and the second UE.

In an embodiment, the request message includes all the parameters required for establishing the Wi-Fi direct connection.

In an embodiment, the first UE and the second UE establish the Wi-Fi direct connection without performing a Wi-Fi direct discovery, a group owner negotiation, a Wi-Fi direct security provisioning, a Wi-Fi direct security association establishment procedure and internet protocol (IP) allocations after receiving the GTK and the PTK.

In another embodiment, the first UE and the second UE establish the Wi-Fi direct connection without the Wi-Fi direct discovery, the group owner negotiation, and the IP allocations after receiving the PMK.

Another embodiment herein discloses a method for establishing a wireless-fidelity (Wi-Fi) direct connection by the first UE with the second UE. The method includes receiving the request message from a trusted network entity. Further, the method includes sending a response message to the trusted network entity. Further, the method includes receiving the setup request message comprising at least one of the Wi-Fi key, the group owner identifier, and network data. Further, the method includes establishing the Wi-Fi direct connection with the second UE based on the setup request message.

In an embodiment, each of the first UE and the second UE configures the at least one Wi-Fi Key in the Wi-Fi interface.

In an embodiment, the Wi-Fi direct connection is established between the first UE and the second UE without authenticating each other.

In an embodiment, the Wi-Fi direct connection is established between the first UE and the second UE by authenticating each other.

In an embodiment, the communication between the first UE and the second UE can be one-to-one communication, one-to-many communication, group communication, or broadcast communication.

In an embodiment, the method further includes sending the Wi-Fi direct connection setup response to the trusted network entity when the Wi-Fi direct connection is established.

Unlike the conventional systems and methods, the proposed method provides a robust and simple mechanism for enabling direct communication between the UEs (for example, first UE and the second UE), more particularly in critical communication scenarios such as natural disasters. The motivation in evolved packet core (EPC) support of the ProSe communication over wireless local area network (WLAN), during critical communication scenario, may be required for the EPC after discovery, to offload the direct communication between the UEs in proximity to directly communicate using other radio access technology (for example, WLAN direct). Thus, during the critical communication scenario, the UEs are required to join the group immediately and initiate securely listening or transmitting (may be by GO) to communicate without signaling overhead.

Unlike conventional systems and methods, the proposed method provides a mechanism for establishing the Wi-Fi direct connection between the first UE and the second UE without performing the Wi-Fi direct discovery, the group owner negotiation, the Wi-Fi direct security provisioning, the Wi-Fi direct security association establishment procedure and the IP allocations after receiving the Wi-Fi key.

For example, broadcast on the critical communication situation by a public safety device, to be received by other devices (smart phone) in the proximity to know the critical situation. Such public safety broadcasting services requires very less connection setup timings. However, the conventional WLAN direct out-of-band provisioning mechanisms require the UEs to exchange control signaling before exchange of user plane data. This signaling exchange before user plane data exchange introduce signaling overload, increase in battery power consumption and processing load in the GO.

Unlike conventional mechanisms, the proposed system and method can be used to provision or enable the direct communication to initiate user plane data exchange immediately (without much signaling overhead) between the UEs. Moreover, when support of direct communication is provided by the trusted network entity, then the trusted network entity can aid in creating trusted direct communication group based on requested proximity service and provision the relevant assistant information (information on the created group details) to the UEs to initiate the direct communication immediately without performing much signaling. With the proposed mechanism, quick and fast connection is setup between the UEs without any user interaction and no or minimal signaling exchanges.

The labels "first" and "second" are used for illustrative purpose and are not intended to limit the scope of the invention. Further, it is to be understood that the labels "first" and "second" may be used interchangeably and can be plurality of devices.

The term "Wi-Fi", "WiFi" and WLAN are used interchangeably thorough out the description.

Referring now to the drawings, and more particularly to FIGS. 1a through 10, where similar reference characters denote corresponding features consistently throughout the figures, there are shown preferred embodiments.

FIG. 1a illustrates a wireless communication system 100a for bootstrapping a wireless fidelity (Wi-Fi) direct communication by a trusted network entity 200, according to an embodiment disclosed herein. The wireless communication system 100a includes a network, first UE 300a, and a second UE 300b. In an embodiment, the network includes a trusted network entity 200. In an example, the trusted network entity is a proximity-services (ProSe) server or a ProSe function. The network described herein can be for example, but not limited to, an evolved UTRAN (EUTRAN).

In an embodiment, the signaling sequence 100a depicts communication between the first UE 300a, the second UE 300b, and the network. Initially, the first UE 300a and the second UE 300b needs to register with the network to receive services that require registration.

At step 102a: The first UE 300a registers with the network to receive services that require registration. This registration is commonly called radio access network (RAN) Attachment (For example: long term evolution (LTE) Attachment). In an embodiment, the first UE 300a can send an ATTACH request for requesting registration with the network. In another embodiment, the first UE 300a can send a tracking area update (TAU) request for registration with the network.

At step 104a: The first UE 300a and the network obtains each other's capability of proximity services for registration. The first UE 300a and the network need to obtain mutually each other's capability of the proximity services. In an embodiment, the first UE 300a capability of the proximity service includes radio capability of the first UE 300a and the first UE 300a network capability of the proximity service. The first UE 300a network capability of the proximity service includes the first UE 300a capability of the proximity service discovery and the first UE 300a network capability of the proximity service communication.

In an embodiment, the network capability of the proximity service includes evolved packet system (EPS) capability of the proximity service and evolved universal terrestrial access network (E-UTRAN) capability of the proximity service. The EPS capability of the proximity service includes, but is not limited to, whether or not the EPS capability of the proximity service discovery is supported, and whether or not the EPS capability of the proximity service is supported; the EPS capability of the proximity service is sent to the first UE 300a when the first UE 300a attachment or the first UE 300a TAU is accepted. The E-UTRAN capability of the proximity service includes, but is not limited to, whether or not the E-UTRAN capability of the proximity service discovery is supported, and whether or not the E-UTRAN capability of the proximity service communication is supported; the E-UTRAN indicates the E-UTRAN capability of the proximity service to the first UE 300a. If both the network and the first UE 300a support the proximity capability, the first UE 300a may activate the capability and initiate a request to the network, to discover the second UE 300b in the proximity, or be discovered by the second UE 300b in the proximity, or initiate a communication with second UE 300b in the proximity.

At step 106a: The second UE 300b registers with the network to receive services that require registration. This registration is commonly called RAN Attachment (For Example: LTE Attachment). In an embodiment, the second UE 300b can send an ATTACH request for requesting registration with the network. In another embodiment, the second UE 300b can send a TAU request for requesting registration with the network.

At step 108a: The second UE 300b and the network obtain each other's capability of proximity services for registration. The second UE 300b and the network need to obtain each other's capability of the proximity services. In an embodiment, the second UE 300b capability of the proximity service includes radio capability of the second UE 300b and the second UE 300b network capability of the proximity service. The second UE 300b network capability of the proximity service includes the second UE 300b capability of the proximity service discovery and the second UE 300b network capability of the proximity service communication.

At step 110a: The trusted network entity 200 can be configured to detect the proximity of the first UE 300a and the second UE 300b. After detecting the first UE 300a and the second UE 300b are in proximity, the trusted network entity 200 can be configured to enable the first UE 300a and the second UE 300b to directly communicate using the Wi-Fi direct connection (i.e., wireless local area network (WLAN) technology).

At step 112a: In an embodiment, once the trusted network entity 200 decides to enable the first UE 300a and the second UE 300b to directly communicate using the Wi-Fi direct connection (for example, during critical communication scenario), the trusted network entity 200 can be configured to send a setup request message to the first UE 300a, which allows the first UE 300a to accept or reject the request message for the particular proximity service. After receiving the request message, the first UE 300a can be configured to send a setup response message to the trusted network entity 200. If the first UE 300a accepts the setup request message, the first UE 300a includes the information associated with the Wi-Fi interface which includes interface address, and a group owner (GO) intent preference for the first UE 300a.

At step 114a: The trusted network entity 200 can be configured to send a setup request message to the second UE 300b, which allows the second UE 300b to accept or reject the request message for the particular proximity service. After receiving the request message, the second UE 300b can be configured to send a setup response message to the trusted network entity 200. If the second UE 300b accepts the request, the second UE 300b includes the information associated with the Wi-Fi interface which includes the interface address and a GO intent preference for the second UE 300b.

At step 116a: After receiving the response message from each of the first UE 300a and the second UE 300b, the trusted network entity 200 performs the Wi-Fi group formation process. Alternatively, in an embodiment, the trusted network entity 200 performs the Wi-Fi group formation irrespective of the response received from the first UE 300a and the second UE 300b, which includes determining the group owner among the first UE 300a and the second UE 300b which is function of the GO intent preferences and service roles and behavior, determining the security level and generates the Wi-Fi keys based on the security level which is function of the service security level requirements, and service timing requirements.

a. In an embodiment, the trusted network entity 200 directly generates the group temporal key (GTK) and pairwise transient key (PTK) for the Wi-Fi group using the medium access control (MAC) of the first UE 300a and the second UE 300b.

b. In another embodiment, the trusted network entity 200 generates the pairwise master key (PMK), the GTK, the PTK, or combination of same for the proximity service enabled first UE 300a and the second UE 300b using pseudo random function.

c. In another embodiment, the trusted network entity 200 generates the GTK and PTK using a group master or a base key assigned for the particular proximity service or for a particular group identity.

Upon generating the Wi-Fi keys, the trusted network entity 200 initiates the Wi-Fi direct group setup request, which includes the associated information. This following are main parameters included in the associated information, which defines the managed Wi-Fi Group.

a. Security keys, (GTK and PTK; or PMK)

b. GO bit: Set to "1" to indicate UE to become as group owner for the Wi-Fi direct group; Set to "0" to indicate UE to become as group client for the Wi-Fi direct group.

At step 118a: The trusted network entity 200 can be configured to send a setup request message to the first UE 300a, the setup request message includes the Wi-Fi key, the group owner identifier, and the network data (i.e., an internet protocol (IP) address) to establish the Wi-Fi direct connection between the first UE 300a and the second UE 300b. This information will allow the first UE 300a to bootstrap the Wi-Fi direct connectivity.

At step 120a: The trusted network entity 200 can be configured to send the setup request message to the second UE 300b, the setup request message includes the Wi-Fi key, the group owner identifier, and the network data to establish the Wi-Fi direct connection. This information will allow the second UE 300b to bootstrap the Wi-Fi direct connectivity.

At step 122a: The first UE 300a and the second UE 300b initiates the direct connection provisioning to establish the Wi-Fi direct connection between them.

At step 124a: The Wi-Fi direct connection is set-up between the first UE 300a and the second UE 300b. Unlike the conventional systems and methods, the proposed method provides a mechanism for establishing the Wi-Fi direct connection between the first UE 300a and the second UE 300b without a Wi-Fi direct discovery, a group owner negotiation, a Wi-Fi direct secure provisioning, and IP allocations.

At step 126a: The first UE 300a and the second UE 300b exchanges the proximity service data. Once the Wi-Fi Group is setup, the first UE 300a and the second UE 300b can initiate sending the proximity service data over the Wi-Fi direct group connection. In an embodiment, the trusted network entity 200 can anytime revoke the Wi-Fi direct group and terminate the Wi-Fi direct link between the first UE 300a and the second UE 300b.

Unlike the conventional systems and methods, the proposed method allows the trusted network entity 200 to trigger Wi-Fi direct connection between the first UE 300a and the second UE 300b without any user interaction and with minimal or zero signaling exchanges.

Although the first UE 300a and the second UE 300b are shown in the FIG. 1a, it is to be understood that any number of UE's can be present. Further, the trusted network entity 200 can be configured to establish the Wi-Fi direct connection between the UE's.

The various actions, acts, blocks, steps, or the like in the sequence diagram 100a may be performed in the order presented, in a different order or simultaneously. Further, in some embodiments, some of the actions, acts, blocks, steps, or the like may be omitted, added, modified, skipped, or the like without departing from the scope of the invention.

FIG. 1b illustrates another wireless communication system 100b for establishing the Wi-Fi direct connection between the first UE 300a and the second UE 300b during emergency situation, according to an embodiment as disclosed herein. In an embodiment, the signaling sequence 100a depicts communication between the first UE 300a, the second UE 300b, and the network. Initially, the first UE 300a and the second UE 300b needs to register with the network to receive services that require registration.

At step 102b: The first UE 300a registers with the network to receive services that require registration. This registration is commonly called RAN Attachment (For example: LTE Attachment). In an embodiment, the first UE 300*a* can send an ATTACH request for requesting registration with the network. In another embodiment, the first UE 300*a* can send a TAU request for registration with the network.

At step 104*b*: The first UE 300*a* and the network obtains each other's capability of proximity services for registration. The first UE 300*a* and the network need to obtain mutually each other's capability of the proximity services. In an embodiment, the first UE 300*a* capability of the proximity service includes radio capability of the first UE 300*a* and the first UE 300*a* network capability of the proximity service. The first UE 300*a* network capability of the proximity service includes the first UE 300*a* capability of the proximity service discovery and the first UE 300*a* network capability of the proximity service communication.

At step 106*b*: The second UE 300*b* registers with the network to receive services that require registration. This registration is commonly called RAN Attachment. In an embodiment, the second UE 300*b* can send an ATTACH request for requesting registration with the network. In another embodiment, the second UE 300*b* can send a TAU request for requesting registration with the network.

At step 108*b*: The second UE 300*b* and the network obtain each other's capability of proximity services for registration. The second UE 300*b* and the network need to obtain each other's capability of the proximity services. In an embodiment, the second UE 300*b* capability of the proximity service includes radio capability of the second UE 300*b* and the second UE 300*b* network capability of the proximity service. The second UE 300*b* network capability of the proximity service includes the second UE 300*b* capability of the proximity service discovery and the second UE 300*b* network capability of the proximity service communication.

At step 110*b*: The trusted network entity 200 can be configured to send the setup request message to the first UE 300*a*, the setup request message includes the Wi-Fi key, the group owner identifier, and the network data to establish the Wi-Fi direct connection between the first UE 300*a* and the second UE 300*b*. This information will allow the first UE 300*a* to bootstrap the Wi-Fi direct connectivity. In an embodiment, the network data includes the IP address. In an embodiment, the information is predefined group information for emergency situation.

At step 112*b*: The trusted network entity 200 can be configured to send the setup request message to the second UE 300*b*, the setup request message includes the Wi-Fi key, the group owner identifier, and the network data to establish the Wi-Fi direct connection. This information will allow the second UE 300*b* to bootstrap the Wi-Fi direct connectivity. The information is predefined group information for emergency situation.

At step 114*b*: During emergency situation, the network is unavailable for the first UE 300*a* and the second UE 300*b*.

At step 116*b*: During the emergency situation, the first UE 300*a* creates predefined group for the proximity services. Similarly, the second UE 300*b* creates predefined group for the proximity services.

At step 118*b*: The Wi-Fi direct connection is set-up between the first UE 300*a* and the second UE 300*b*.

At step 120*b*: The first UE 300*a* and the second UE 300*b* exchanges the proximity service data. Once the Wi-Fi Group is setup, the first UE 300*a* and the second UE 300*b* can initiate sending the proximity service data over the Wi-Fi direct group connection. In an embodiment, the trusted network entity 200 can anytime revoke the Wi-Fi direct group and terminate the Wi-Fi direct link between the first UE 300*a* and the second UE 300*b*.

The various actions, acts, blocks, steps, or the like in the sequence diagram 100*b* may be performed in the order presented, in a different order or simultaneously. Further, in some embodiments, some of the actions, acts, blocks, steps, or the like may be omitted, added, modified, skipped, or the like without departing from the scope of the invention.

FIG. 2 illustrates various units in the trusted network entity 200, according to an embodiment disclosed herein. In an embodiment, the trusted network entity 200 includes a receiver (Rx) unit 202, a processor unit 204, a memory unit 206, and a transmitter (Tx) unit 208.

The Rx unit 202 can be configured to receive signaling messages from the first UE 300*a* and the second UE 300*b*. The processor unit 204 can be configured to send the request message to each of the first UE 300*a* and the second UE 300*b* by using the Tx unit 208. In an embodiment, the request message is the WLAN direct Service Authorization request message. The request message includes parameters required for establishing the Wi-Fi direct connection. Further, the processor unit 204 can be configured to receive the response message from each of the first UE 300*a* and the second UE 300*b* by using the Rx unit 202. In an embodiment, the response message is a WLAN direct service authorization response message (ACCEPT). The response message includes the interface address and group owner (GO) intent. The interface address is a physical MAC address of a Wi-Fi interface; or an address of a virtual MAC Wi-Fi interface allocated for a ProSe communication.

Further, the processor unit 204 can be configured to generate the Wi-Fi key based on the response message received from the first UE 300*a* and the second UE 300*b*. In an embodiment, the Wi-Fi key is the GTK and the PTK. In another embodiment, the Wi-Fi key is the GTK, the PTK, and the PMK. In an embodiment, the first UE 300*a* or the second UE 300*b*, whose GO intent is higher, is declared as the GO. Further, the processor unit 204 can be configured to send the setup request message to each of the first UE 300*a* and the second UE 300*b*, wherein the setup request message includes the Wi-Fi key, the group owner identifier, and the network data to establish the Wi-Fi direct connection between the first UE 300*a* and the second UE 300*b*.

The FIG. 2 shows a limited overview of the trusted network entity 200 but, it is to be understood that another embodiment is not limited thereto. Further, the trusted network entity 200 can include different units communicating among each other along with other hardware or software components. By way of illustration, both an application running on the trusted network entity 200 and the trusted network entity 200 can be the component.

FIG. 3 illustrates various units in the UE 300*a*/300*b*, according to an embodiment disclosed herein. In an embodiment, the first UE 300*a* includes a receiver (Rx) unit 302, a processor unit 304, a memory 306, and a transmitter (Tx) unit 308. In an embodiment, the processor unit 304 can include a plurality of interfaces such as a long term evolution (LTE) interface and a Wi-Fi direct interface, and so on (i.e., not shown) for receiving the signaling messages from the trusted network entity 200 to establish the Wi-Fi direct connection.

The processor unit 304 can be configured to receive the request message from the trusted network entity 200 by using the Rx unit 302. In an embodiment, the request message includes the parameters required for establishing the Wi-Fi direct connection. After receiving the request message, the processor unit 304 can be configured to send the response message to the trusted network entity 200. In an embodiment, the response message includes the interface address, the GO intent, or combination of same. The interface address is the physical MAC address of the Wi-Fi interface or the address of the virtual MAC Wi-Fi interface allocated for the ProSe communication.

Further, the processor unit 304 can be configured to receive the setup request message including the Wi-Fi key, the group owner identifier, and the network data from the trusted network entity 200. In an embodiment, the Wi-Fi key is the GTK and the PTK. In an embodiment, the Wi-Fi key is the GTK, the PTK, and the PMK. In an embodiment, based on the setup request message, the processor unit 304 in the first UE 300a (i.e., UE) can be configured to establish the Wi-Fi direct connection with the second UE 300b (i.e., other UE). Further, the processor unit 304 can be configured to send the Wi-Fi direct connection setup message response to the trusted network entity 200 when the Wi-Fi direct connection is established.

In an embodiment, the second UE 300b (i.e., UE) can also include the various units (such as the Rx unit 202, the processor unit 204, the memory 206, and the Tx unit 208) as described above to establish the Wi-Fi direct connection with the first UE 300a (i.e., other UE).

The FIG. 3 shows a limited overview of the UE 300a/300b but, it is to be understood that another embodiment is not limited thereto. Further, the UE 300a/300b can include different units communicating among each other along with other hardware or software components. By way of illustration, both an application running on the UE 300a/300b and the UE 300a/300b can be the component.

FIG. 4 is a flow chart illustrating a method 400 for joining the Wi-Fi direct connection by the UE, according to an embodiment as disclosed herein. In an embodiment, the UE described herein can be the first UE 300a. In another embodiment, the UE described herein can be the second UE 300b.

At step 402, the method 400 includes initiating the process for joining the Wi-Fi direct connection by the UE. The method 400 allows the UE to initiate the process to join the Wi-Fi direct connection. At step 404, the method 400 includes obtaining assisted information securely from the trusted network entity 200. The method 400 allows the UE to obtain the assisted information securely from the trusted network entity 200. If it is determined, at step 406, that the assisted information is to join the Wi-Fi direct communication immediately then, at step 408, the method 400 includes joining the WLAN direct communication without performing 4-way handshake using GTK and PTK. The method 400 allows the UE to join the WLAN direct communication without performing 4-way handshake using GTK and PTK.

If it is determined, at step 406, that the assisted information is not to join the Wi-Fi direct communication immediately then, at step 410, the method 400 includes joining the WLAN direct communication by performing 4-way handshake using the received PMK. The method 400 allows the UE to join the WLAN direct communication by performing 4-way handshake using the received PMK.

The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a flow chart illustrating a method 500 for establishing the Wi-Fi direct connection by the trusted network entity 200, according to an embodiment as disclosed herein. At step 502, the method 500 includes initiating the process to establish the Wi-Fi direct connection. The method 500 allows the trusted network entity 200 to initiate the process to establish the Wi-Fi direct connection.

At step 504, the method 500 includes determining the type of application, UE (i.e., the first UE 300a or the second UE 300b) capability or intention; and generating or issuing the security context along with the assisted information. If it is determined, at step 506, that the application requires immediate joining then, at step 508, the method 500 includes issuing the assisted information including the derived PTK and GTK of the authorized group created so that the UE joins the group without 4-way handshaking. The method 500 allows the trusted network entity 200 to issue the assisted information including the derived PTK and GTK of the authorized group created so that the UE joins the group without 4-way handshaking.

If it is determined, at step 506, that the application does not require immediate joining then, at step 510, the method 500 includes issuing the assisted information including the PMK so that the UE joins the WLAN direct communication by performing 4-way handshake. The method 500 allows the trusted network entity 200 to issue the assisted information including the PMK so that the UE joins the WLAN direct communication by performing 4-way handshake.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

FIG. 6 is a flow chart illustrating a method 600 for establishing the Wi-Fi direct connection between the first UE 300a and the second UE 300b by the trusted network entity 200, according to an embodiment as disclosed herein.

At step 602, the method 600 includes sending the request message to each of the first UE 300a and the second UE 300b. The method 600 allows the processor unit 204 to send the request message to each of the first UE 300a and the second UE 300b. In an embodiment, the request message is the WLAN direct Service Authorization request message. The request message includes the parameters required for establishing the Wi-Fi direct connection between the first UE 300a and the second UE 300b.

At step 604, the method 600 includes receiving the response message from each of the first UE 300a and the second UE 300b. The method 600 allows the processor unit 204 to receive the response message from each of the first UE 300a and the second UE 300b. In an embodiment, the response message is the WLAN direct Service Authorization Response message. The response message includes the interface address, the GO intent, or the combination of same. The interface address is the physical MAC address of the Wi-Fi interface; or the address of the virtual MAC Wi-Fi interface allocated for the ProSe communication.

At step 606, the method 600 includes generating the Wi-Fi key based on the response message. The method 600 allows the processor unit 204 to generate the Wi-Fi key based on the response message. In an embodiment, the Wi-Fi key is the GTK, the PTK, and the PMK. In another embodiment, the Wi-Fi key is the GTK and the PTK. Further, after generating the Wi-Fi key, the first UE 300a or the second UE 300b, whose GO intent is higher, is declared as the group owner. In an embodiment, the first UE 300a is declared as the group owner. In another embodiment, the second UE 300b is declared as the group owner.

At step 608, the method 600 includes sending the setup request message to each of the first UE 300a and the second UE 300b, wherein the setup request message includes the Wi-Fi key, the group owner identifier, the network data, or combination of same to establish the Wi-Fi direct connection between the first UE 300a and the second UE 300b. The method 600 allows the processor unit 204 to send the setup request message to each of the first UE 300a and the second UE 300b, wherein the setup request message includes the Wi-Fi key, the group owner identifier, the network data, or combination of same to establish the Wi-Fi direct connection between the first UE 300a and the second UE 300b.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a flow chart illustrating a method 700 for establishing the Wi-Fi direct connection by the UE with the other UE by the trusted network entity 200, according to an embodiment as disclosed herein. In an embodiment, the UE described herein can be the first UE 300a; and the other UE described herein can be the second UE 300b. In another embodiment, the UE described herein can be the second UE 300b; and the other UE described herein can be the first UE 300a.

At step 702, the method 700 includes receiving the request message from the trusted network entity 200. The method 700 allows the processor unit 304 to receive the request message from the trusted network entity 200. In an embodiment, the request message is a WLAN direct service authorization request message. The request message includes parameters required for establishing the Wi-Fi direct connection between the UE and the other UE.

At step 704, the method 700 includes sending the response message to the trusted network entity 200. The method 700 allows the processor unit 304 to send the response message to the trusted network entity 200. In an embodiment, the response message includes the interface address and the GO intent. The interface address is the physical MAC address of the Wi-Fi interface or the address of the virtual MAC Wi-Fi interface allocated for the ProSe communication.

At step 706, the method 700 includes receiving the setup request message comprising the Wi-Fi key, the group owner identifier, the network data, or the combination of same, from the trusted network entity 200. The method 400 allows the processor unit 304 to receive the setup request message comprising the Wi-Fi key, the group owner identifier, the network data, or combination of same, from the trusted network entity 200. In an embodiment, the Wi-Fi key is the GTK, the PTK, and the PMK. In another embodiment, the Wi-Fi key is the GTK and the PTK.

At step 708, the method 700 includes establishing the Wi-Fi direct connection with the other UE based on the setup request message. The method 700 allows the processor unit 304 to establish the Wi-Fi direct connection with the other UE based on the setup request message. In an embodiment, the UE configure the Wi-Fi Key in the Wi-Fi interface. In an embodiment, the Wi-Fi direct connection is established by the UE with the other UE without authenticating each other. In another embodiment, the Wi-Fi direct connection is established by the UE with the other UE by authenticating each other. In an embodiment, the UE and the other UE establish the Wi-Fi direct connection without the Wi-Fi direct discovery, the group owner negotiation, the Wi-Fi direct security provisioning, and IP allocations in response to receiving the GTK and the PTK. In another embodiment, the UE and the other UE establish the Wi-Fi direct connection without the Wi-Fi direct discovery, the group owner negotiation, and the IP allocations in response to receiving the PMK.

At step 710, the method 700 includes sending the Wi-Fi direct connection setup message response to the trusted network entity 200 when the Wi-Fi direct connection is established. The method 700 allows the processor unit 304 to send the Wi-Fi direct connection setup message response to the trusted network entity 200 when the Wi-Fi direct communication is established.

The various actions, acts, blocks, steps, or the like in the method 700 may be performed in the order presented, in a different order or simultaneously. Further, in some embodiments, some of the actions, acts, blocks, steps, or the like may be omitted, added, modified, skipped, or the like without departing from the scope of the invention.

FIG. 8 is a sequence diagram 800 depicts various signaling messages where Wi-Fi keys are sent to the first UE 300a and the second UE 300b by the trusted network entity 200 to provision the Wi-Fi direct communication, according to an embodiment as disclosed herein. In an embodiment, the signaling sequence 800 depicts communication between the first UE 300a, the second UE 300b, and the trusted network entity 200. The first UE 300a includes a LTE interface 300a1 and a Wi-Fi direct interface 300a2. Similarly, the second UE 300b includes a LTE interface 300b1 and a Wi-Fi direct interface 300b2. Once the trusted network entity 200 decides to setup the Wi-Fi direct group between the first UE 300a and the second UE 300b that are in proximity, the following sequence of steps are followed as described below:

At step 802: The trusted network entity 200 can be configured to transmit the request message to the LTE interface 300a1. In an embodiment, the request message includes the parameters needed for establishing a service session (or the Wi-Fi direct communication) between the first UE 300a and the second UE 300b.

At step 804: If the LTE interface 300a1 accepts the request message then, the LTE interface 300a1 transmits the response message to the trusted network entity 200. In an embodiment, the response message is the WLAN direct service authorization response (ACCEPT) message. The response message includes the interface address and the GO intent. In an embodiment, the interface address is the physical MAC address of the Wi-Fi direct interface 300a2. In another embodiment, the interface address is the address of the virtual MAC Wi-Fi direct interface 300a2 allocated for the ProSe communication.

At step 806: The trusted network entity 200 can be configured to transmit the request message to the LTE interface 300b1. In an embodiment, the request message includes the parameters needed for establishing the service session (or the Wi-Fi direct communication) between the first UE 300a and the second UE 300b.

At step 808: If the LTE interface 300b1 accepts the request message then, the LTE interface 300b1 transmits the response message to the trusted network entity 200. In an embodiment, the response message is the WLAN direct service authorization response (ACCEPT) message. The response message includes the interface address and the GO intent. In an embodiment, the interface address is the physical MAC address of the Wi-Fi direct interface 300b2. In another embodiment, the interface address is the address of the virtual MAC Wi-Fi direct interface 300b2 allocated for the ProSe communication.

At step 810: After receiving the response messages (i.e., service authorization responses) from the LTE interface 300a1 and the LTE interface 300b1, the trusted network entity 200 can be configured to identify the GO of the Wi-Fi direct group. In an embodiment, either the first UE 300a or the second UE 300b, whose GO intent is higher, is identified as the Wi-Fi direct GO. In another embodiment, when the GO intent of the first UE 300a and the second UE 300b is same or not then, the trusted network entity 200 selects either the first UE 300a or the second UE 300b to be the GO.

At step 812: Based on the proximity service, in an embodiment, the trusted network entity 200 can be configured to create group and generate the GTK and PTK based on the response message received from the LTE interface 300a1. In another embodiment, the trusted network entity 200 can be configured to generate the GTK and PTK based on the response message received from the LTE interface 300b1.

a. In an embodiment, the GTK is generated as follows:
        i. GTK←PRF-256 (GMK, Random Number, "Group key expansion", <other possible inputs>)
    b. In an embodiment, the PTK is generated as follows:
        i. PTK←PRF-512 (PMK, Random Number, Init Counter, first UE MAC ADDRESS| second UE MAC ADDRESS); where PMK←PRF-256 (MK, random), where MK is the master key of the LTE group.

At step 814: The trusted network entity 200 can be configured to send the setup request message to the LTE interface 300a1. In an embodiment, the setup request message is the WAN direct Group setup request message. The setup request message includes the parameters GO=1, GTK, PTK, and key validity time for the Wi-Fi direct group that is to be formed. Here, GO=1 indicates that the first UE 300a is the Wi-Fi direct GO. In another embodiment, the setup request message also includes additional parameters such as group SSID, operating frequency, or the like which are required to setup the Wi-Fi direct group.

At step 816: After receiving the setup request message, the LTE interface 300a1 configures the GTK and PTK in the Wi-Fi interface 300a2. Further, the LTE interface 300a1 sends the setup message response to the trusted network entity 200 and initiates the creation of the autonomous group as GO and starts beaconing on the specified frequency. In an embodiment, the setup message response is the WLAN direct group setup response.

At step 818: The trusted network entity 200 can be configured to send the setup request message to the LTE interface 300b1. In an embodiment, the setup request message is the WAN direct group setup request message. The setup request message includes the parameters GO=0, GTK, PTK, and key validity time for the Wi-Fi direct group that is to be formed. Here, GO=0 indicates that the second UE 300b is the Wi-Fi direct client. In another embodiment, the setup request message also includes additional parameters such as group SSID, operating frequency, or the like which are required to join the Wi-Fi direct group.

At step 820: After receiving the setup request message, the LTE interface 300b1 configured the GTK and PTK in the Wi-Fi interface 300b2; and hops to the specified frequency.

At step 822: The LTE interface 300a1 will provision all required parameters in the Wi-Fi direct interface 300a2 and triggers the Wi-Fi direct connection setup. Similarly, the LTE interface 300b1 will provision all the required parameter to the Wi-Fi direct interface 300b2 to trigger the provisioning to join the group of the first UE 300a.

At step 824: As part of the provisioning, in an embodiment, the steps "M1" and "M2" of the Wi-Fi protected setup (i.e., authentication) is performed. In another embodiment, the steps "M1" and "M2" are skipped as the first UE 300a and the second UE 300b are already being authenticated by the trusted network entity 200.

At step 826: As the GTK and PTK are already configured, the Wi-Fi direct interface 300a2 and the Wi-Fi direct interface 300b2 skip the 4 way handshake and behave like the Wi-Fi direct group with the second UE 300b directly joining the group of the first UE 300a thus, completing the provision. Once the second UE 300b has successfully joined the Wi-Fi direct group of the first UE 300a, the second UE 300b sends the setup message response to the trusted network entity 200. After receiving the setup response, the trusted network entity 200 triggers the data flow for the second UE 300b. In an embodiment, for critical communication, the second UE 300b can send the setup message response to the trusted network entity 200 on receiving the group setup request and then proceed to join the Wi-Fi direct group and listen to the ongoing data flow from the first UE 300a.

At step 828: The Wi-Fi direct communication is established and the data flow is triggered between the first UE 300a and the second UE 300b.

The various actions, acts, blocks, steps, or the like in the sequence diagram 800 may be performed in the order presented, in a different order or simultaneously. Further, in some embodiments, some of the actions, acts, blocks, steps, or the like may be omitted, added, modified, skipped, or the like without departing from the scope of the invention.

FIG. 9 is another sequence diagram 900 depicts various signaling messages where Wi-Fi keys are sent to the first UE 300a and the second UE 300b by the trusted network entity 200 to provision the Wi-Fi direct communication, according to an embodiment as disclosed herein. In an embodiment, the signaling sequence 900 depicts communication between the first UE 300a, the second UE 300b, and the trusted network entity 200. The first UE 300a includes the LTE interface 300a1 and the Wi-Fi direct interface 300a2. Similarly, the second UE 300b includes the LTE interface 300b1 and the Wi-Fi direct interface 300b2. Once the trusted network entity 200 decides to setup the Wi-Fi direct group between the first UE 300a and the second UE 300b that are in proximity, the following sequence of steps are followed as described below:

At step 902: The trusted network entity 200 can be configured to transmit the request message to the LTE interface 300a1. In an embodiment, the request message includes the parameters needed for establishing the service session (or the Wi-Fi direct communication) between the first UE 300a and the second UE 300b.

At step 904: If the LTE interface 300a1 accepts the request message then, the LTE interface 300a1 transmits the response message to the trusted network entity 200. In an embodiment, the response message is the WLAN direct service authorization response (ACCEPT) message. The response message includes the interface address and the GO intent. In an embodiment, the interface address is the physical MAC address of the Wi-Fi direct interface 300a2. In another embodiment, the interface address is the address of the virtual MAC Wi-Fi direct interface 300a2 allocated for the ProSe communication.

At step 906: The trusted network entity 200 can be configured to transmit the request message to the LTE interface 300b1. In an embodiment, the request message includes the parameters needed for establishing the service session (or the Wi-Fi direct communication) between the first UE 300a and the second UE 300b.

At step 808: If the LTE interface 300b1 accepts the request message then, the LTE interface 300b1 transmits the response message to the trusted network entity 200. In an embodiment, the response message is the WLAN direct service authorization response (ACCEPT) message. The response message includes the interface address and the GO intent. In an embodiment, the interface address is the physical MAC address of the Wi-Fi direct interface 300b2. In another embodiment, the interface address is the address of the virtual MAC Wi-Fi direct interface 300b2 allocated for the ProSe communication.

At step 910: After receiving the response messages (i.e., service authorization responses) from the LTE interface 300a1 and the LTE interface 300b1, the trusted network entity 200 can be configured to identify the group owner of the Wi-Fi direct group. In an embodiment, either the first UE 300a or the second UE 300b, whose GO intent is higher, is identified as the Wi-Fi direct GO. In another embodiment, when the GO intent of the first UE 300a and the second UE 300b is same or not then, the trusted network entity 200 selects either the first UE 300a or the second UE 300b to be the GO.

At step 912: Based on the proximity service, in an embodiment, the trusted network entity 200 can be configured to create group and generates the PMK based on the response message received from the LTE interface 300a1 and the LTE interface 300b1.

a. In an embodiment, the GTK is generated as follows:
  i. PMK←PRF-256 (MK, random) where MK is the master key of the LTE-direct group At step 914: The trusted network entity 200 can be configured to send the setup request message to the LTE interface 300a1. In an embodiment, the setup request message is the WAN direct Group setup request message. The setup request message includes the parameters GO=1, the PMK, and key validity time for the Wi-Fi direct group that is to be formed. Here, GO=1 indicates that the first UE 300a is the Wi-Fi direct GO. In another embodiment, the setup request message also includes additional parameters such as group SSID, operating frequency, or the like which are required to setup the Wi-Fi direct group.

At step 916: After receiving the setup request message, the LTE interface 300a1 stores the PMK and sends the setup message response to the trusted network entity 200 and initiates the creation of the autonomous group as GO and starts beaconing on the specified frequency. In an embodiment, the setup message response is the WLAN direct group setup response.

At step 918: The trusted network entity 200 can be configured to send the setup request message to the LTE interface 300b1. In an embodiment, the setup request message is the WAN direct group setup request message. The setup request message includes the parameters GO=0, PMK, and key validity time for the Wi-Fi direct group that is to be formed. Here, GO=0 indicates that the second UE 300b is the Wi-Fi direct client. In another embodiment, the setup request message also includes additional parameters such as group SSID, operating frequency, or the like which are required to join the Wi-Fi direct group.

At step 920: After receiving the setup request message, the LTE interface 300b1 stores the PMK and hops to the specified frequency and initiates provisioning to join the group of the first UE 300a.

At step 922: The LTE interface 300a1 will provision all the required parameters in the Wi-Fi direct interface 300a2 to trigger the provisioning. Similarly, the LTE interface 300b1 sends the request to the Wi-Fi direct interface 300b2 to trigger the provisioning to join the group of the first UE 300a.

At step 924: As part of the provisioning, in an embodiment, the steps "M1" and "M2" of the Wi-Fi protected setup (i.e., authentication) is performed. In another embodiment, the steps "M1" and "M2" are skipped as the first UE 300a and the second UE 300b are already being authenticated by the trusted network entity 200.

At step 926: By using the configured PMK, the Wi-Fi direct interface 300a2 and the Wi-Fi direct interface 300b2 performs the 4 way handshake to derive the PTK and GTK for the Wi-Fi direct group.

At step 928: After generating the GTK and PTK, the second UE 300b successfully joins the Wi-Fi direct group of the first UE 300a. After receiving the setup response, the trusted network entity 200 triggers the data flow for the second UE 300b. In an embodiment, for critical communication, the second UE 300b can send the setup message response to the trusted network entity 200 on receiving the group setup request and then proceed to join the Wi-Fi direct group and listen to the ongoing data flow from the first UE 300a.

At step 930: The Wi-Fi direct communication is established and the data flow is triggered between the first UE 300a and the second UE 300b.

The various actions, acts, blocks, steps, or the like in the sequence diagram 900 may be performed in the order presented, in a different order or simultaneously. Further, in some embodiments, some of the actions, acts, blocks, steps, or the like may be omitted, added, modified, skipped, or the like without departing from the scope of the invention.

FIG. 10 illustrates a computing environment implementing the method for bootstrapping the Wi-Fi direct communication by the trusted network entity 200, according to an embodiment as disclosed herein. As depicted in the figure, the computing environment 1002 comprises at least one processing unit 1008 that is equipped with a control unit 1004 and an arithmetic logic unit (ALU) 1006, a memory 1010, a storage unit 1012, plurality of networking devices 1016 and a plurality input output (I/O) devices 1014. The processing unit 1008 is responsible for processing the instructions of the schemes. The processing unit 1008 receives commands from the control unit 1004 in order to perform its processing. Further, any logical and arithmetic operations involved in the execution of the instructions are computed with the help of the ALU 1006.

The overall computing environment 1002 can be composed of multiple homogeneous or heterogeneous cores, multiple CPUs of different kinds, special media and other accelerators. The processing unit 1008 is responsible for processing the instructions of the schemes. Further, the plurality of processing units 1008 may be located on a single chip or over multiple chips.

The scheme comprising of instructions and codes required for the implementation are stored in either the memory unit 1010 or the storage 1012 or both. At the time of execution, the instructions may be fetched from the corresponding memory 1010 or storage 1012, and executed by the processing unit 1008.

In case of any hardware implementations various networking devices 1016 or external I/O devices 1014 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 10 include blocks which can be at least one of a hardware device, or a combination of hardware device and software units.

Meanwhile, an inner structure of a device (not shown) in a wireless communication system according to an embodiment of the present disclosure will be described below. Here, the device may be one of a UE, a trusted network entity, a device, and the like.

The device includes a transmitter, a controller, a receiver, and a storage unit.

The controller controls the overall operation of the device. More particularly, the controller controls the device to perform an operation related to a mechanism for bootstrapping a Wi-Fi direct communication between UEs by a trusted network entity according to an embodiment of the present disclosure. The operation related to the mechanism for bootstrapping the Wi-Fi direct communication between the UEs by the trusted network entity according to an embodiment of the present disclosure is performed in the manner described with reference to FIGS. 1a to 10, and a description thereof will be omitted herein.

The transmitter transmits various signals and various messages, and the like to other devices, and the like included in the wireless communication system under a control of the controller. The various signals, the various messages, and the like transmitted in the transmitter have been described in FIGS. 1a to 10 and a description thereof will be omitted herein.

The receiver receives various signals, various messages, and the like from other devices included in the wireless communication system under a control of the controller. The various signals, the various messages, and the like received in the receiver have been described in FIGS. 1a to 10 and a description thereof will be omitted herein.

The storage unit stores a program related to a mechanism for bootstrapping a Wi-Fi direct communication between UEs by a trusted network entity according to an embodiment of the present disclosure, various data, and the like.

The storage unit stores the various signals and the various messages which the receiver receives from the other devices, and the like.

While the transmitter, the controller, the receiver, and the storage unit are described in the device as separate units, it is to be understood that this is merely for convenience of description. In other words, two or more of the transmitter, the controller, the receiver, and the storage unit may be incorporated into a single unit. The device may be implemented with one processor.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Accordingly the embodiments herein provide a method for establishing a wireless-fidelity (Wi-Fi) direct connection between a first user equipment (UE) and a second UE. The method includes sending, by a trusted network entity, a request message to each of the first UE and the second UE. Further, the method includes receiving, by the trusted network entity, a response message from each of the first UE and the second UE. Further, the method includes generating, by the trusted network entity, at least one Wi-Fi key based on the response message. Further, the method includes sending, by the trusted network entity, a setup request message to each of the first UE and the second UE, wherein the setup request message comprises at least one of the Wi-Fi key, a group owner identifier, and network data to establish the Wi-Fi direct connection between the first UE and the second UE.

Additionally, the Wi-Fi key may be a group temporal key (GTK) and a pairwise transient key (PTK).

Additionally, the Wi-Fi key may be a GTK, a PTK, and a pairwise master key (PMK).

Additionally, the response message may comprise at least one of an interface address and group owner (GO) intent.

Additionally, the first UE and the second UE may establish the Wi-Fi direct connection without a Wi-Fi direct discovery, a group owner negotiation, a Wi-Fi direct security provisioning, and internet protocol (IP) allocations in response to receiving a GTK and a PTK.

Additionally, the first UE and the second UE may establish the Wi-Fi direct connection without a Wi-Fi direct discovery, a group owner negotiation, and IP allocations in response to receiving a PMK.

Accordingly the embodiments herein provide a method for establishing a wireless-fidelity (Wi-Fi) direct connection by a first user equipment (UE) with a second UE, the method comprising: receiving, by the first UE, a request message from a trusted network entity; sending, by the first UE, a response message to the trusted network entity; receiving, by the first UE, a setup request message comprising at least one Wi-Fi key, a group owner identifier, and network data, from the trusted network entity; and establishing, by the first UE, the Wi-Fi direct connection with the second UE based on the setup request message.

Additionally, each of the first UE and the second UE may configure the at least one Wi-Fi Key in the Wi-Fi interface.

Additionally, the Wi-Fi direct connection may be established between the first UE and the second UE without authenticating each other.

Additionally, the Wi-Fi direct connection may be established between the first UE and the second UE by authenticating each other.

Additionally, the method may further comprise: sending, by the first UE, a Wi-Fi direct connection setup response to the trusted network entity if the Wi-Fi direct connection is established.

Additionally, the Wi-Fi key may be a group temporal key (GTK) and a pairwise transient key (PTK).

Additionally, the Wi-Fi key may be a GTK, a PTK, and a pairwise master key (PMK).

Additionally, the first UE may establish the Wi-Fi direct connection with the second UE without a Wi-Fi direct discovery, a group owner negotiation, a Wi-Fi direct security provisioning, and internet protocol (IP) allocations in response to receiving a GTK and a PTK.

Additionally, the first UE may establish the Wi-Fi direct connection with the second UE without a Wi-Fi direct discovery, a group owner negotiation, and internet protocol (IP) allocations in response to receiving a PMK.

Accordingly the embodiments herein provide a trusted network entity for establishing a wireless-fidelity (Wi-Fi) direct connection between a first user equipment (UE) and a second UE. The trusted network entity includes a memory and a processor coupled to the memory. The processor is configured with processor executable instructions to send a request message to each of the first UE and a second UE. Further, the processor is configured to receive a response message from each of the first UE and the second UE. Further, the processor is configured to generate at least one Wi-Fi key based on the response message. Further, the processor is configured to send a setup request message to each of the first UE and the second UE, wherein the setup request message comprises the at least one Wi-Fi key, a group owner identifier, networking data to establish the Wi-Fi direct connection between the first UE and the second UE.

Accordingly the embodiments herein provide a user equipment (UE) for establishing a wireless-fidelity (Wi-Fi) direct connection. The UE includes a memory and a processor coupled to the memory. The processor is configured with processor executable instructions to receive a request message from a trusted network entity. Further, the processor is configured to send a response message to the trusted network entity. Further, the processor is configured to receive a setup request message comprising at least one of a Wi-Fi key, a group owner identifier, and network data from the trusted network entity. Further, the processor is configured to establish the Wi-Fi direct connection with other UE based on the setup request message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for establishing a connection by an apparatus, the method comprising:
   sending a request message to each of a first user equipment (UE) and a second UE, the request message including parameters required for establishing the connection;
   receiving a response message from each of the first UE and the second UE, the response message including an interface address for the connection;
   identifying a type of an application of each of the first UE and the second UE, and a security level based on the response message;
   generating at least one key based on the security level and the type of the application of each of the first UE and the second UE; and
   sending a setup request message to each of the first UE and the second UE,
   wherein the setup request message comprises the at least one key, a group owner identifier, and network data to establish the connection between the first UE and the second UE.

2. The method of claim 1, wherein the at least one key comprises either a pairwise master key (PMK) or both a group temporal key (GTK) and a pairwise transient key (PTK).

3. The method of claim 1, wherein the response message further comprises group owner intent.

4. The method of claim 1,
   wherein the first UE and the second UE establish a wireless-fidelity (Wi-Fi) direct connection in response to receiving the at least one key, and
   wherein the connection is a wireless-fidelity (Wi-Fi) direct connection.

5. A method for establishing a connection by a first user equipment (UE) with a second UE, the method comprising:
   receiving, from an apparatus, a request message including parameters required for establishing the connection;
   sending, to the apparatus, a response message including an interface address for the connection;
   receiving, from the apparatus, a setup request message comprising at least one key, a group owner identifier, and network data;

identifying a security level based on the at least one key; and establishing the connection with the second UE based on the setup request message based on the security level, wherein the at least one key is generated based on a type of an application of the first UE and the security level.

6. The method of claim 5, wherein each of the first UE and the second UE configures the at least one Key in a wireless-fidelity (Wi-Fi) interface.

7. The method of claim 5, wherein the connection is established between the first UE and the second UE by authenticating each other.

8. The method of claim 5, further comprising:
sending, by the first UE, a connection setup response to the apparatus if the connection is established.

9. The method of claim 5, wherein the at least one key comprises either a pairwise master key (PMK) or both a group temporal key (GTK) and a pairwise transient key (PTK).

10. The method of claim 5, wherein the first UE establishes the connection with the second UE in response to receiving the at least one key.

11. An apparatus for establishing a connection, the apparatus comprising:
a memory; and
at least one processor coupled to the memory,
wherein the at least one processor configured with processor executable instructions to:
send a request message to each of a first user equipment (UE) and a second UE, the request message including parameters required for establishing the connection,
receive a response message from each of the first UE and the second UE, the response message including an interface address for the connection,
identify a type of an application of each of the first UE and the second UE, and a security level based on the response message,
generate at least one key based on the security level and the type of the application of each of the first UE and the second UE, and
send a setup request message to each of the first UE and the second UE, and
wherein the setup request message comprises the at least one Wi-Fi key, a group owner identifier, and network data to establish the connection between the first UE and the second UE.

12. A first user equipment (UE) for establishing a connection with a second UE, the first UE comprising:
a memory; and
at least one processor coupled to the memory,
wherein the at least one processor configured with processor executable instructions to:
receive a request message including parameters required for establishing for connection from an apparatus,
send a response message including an interface address for the connection to the apparatus,
receive a setup request message comprising at least one key, a group owner identifier, and network data, from the apparatus,
identify a security level based on the at least one key, and
establish the connection with the second UE based on the setup request message based on the security level, and
wherein the at least one key is generated based on a type of an application of the first UE and the security level.

13. The apparatus of claim 11, wherein the at least one key comprises either a pairwise master key (PMK) or both a group temporal key (GTK) and a pairwise transient key (PTK).

14. The apparatus of claim 11, wherein the response message further comprises group owner intent.

15. The apparatus of claim 11, wherein the first UE and the second UE establish the connection in response to receiving the at least one key.

16. The first UE of claim 12, wherein each of the first UE and the second UE configures the at least one Key in a wireless-fidelity (Wi-Fi) interface.

17. The first UE of claim 12, wherein the connection is established between the first UE and the second UE by authenticating each other.

18. The first UE of claim 12,
wherein the first UE sends a connection setup response to the apparatus if a wireless-fidelity (Wi-Fi) direct connection is established.

19. The first UE of claim 12, wherein the first UE establishes the connection with the second UE in response to receiving the at least one key.

* * * * *